(12) United States Patent
Partlo et al.

(10) Patent No.: US 11,015,012 B2
(45) Date of Patent: May 25, 2021

(54) HYDROPHOBIC POLYURETHANE RESINS

(71) Applicant: 3M INNOVATIVE PROPERTIES COMPANY, St. Paul, MN (US)

(72) Inventors: Walter E. Partlo, Inver Grove Heights, MN (US); Chetan P. Jariwala, Woodbury, MN (US); Yongshang Lu, Woodbury, MN (US); Michael T. Hayes, St. Anthony, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 346 days.

(21) Appl. No.: 16/230,801

(22) Filed: Dec. 21, 2018

(65) Prior Publication Data

US 2019/0194377 A1     Jun. 27, 2019

Related U.S. Application Data

(60) Provisional application No. 62/610,712, filed on Dec. 27, 2017.

(51) Int. Cl.
| | |
|---|---|
| *D06N 3/00* | (2006.01) |
| *C08G 18/32* | (2006.01) |
| *C08G 18/76* | (2006.01) |
| *C08G 18/24* | (2006.01) |
| *C08G 18/38* | (2006.01) |
| *C08G 18/10* | (2006.01) |

(52) U.S. Cl.
CPC ......... *C08G 18/3221* (2013.01); *C08G 18/10* (2013.01); *C08G 18/246* (2013.01); *C08G 18/3868* (2013.01); *C08G 18/7671* (2013.01); *D06N 3/0011* (2013.01); *D06N 3/0059* (2013.01); *D06N 2203/068* (2013.01); *D06N 2209/142* (2013.01)

(58) Field of Classification Search
CPC ............ D06N 3/00; B32B 27/04; B32B 27/12
See application file for complete search history.

(56) References Cited

U.S. PATENT DOCUMENTS

| | | | | |
|---|---|---|---|---|
| 4,540,497 A | * | 9/1985 | Chang ................. | C07C 279/18 |
| | | | | 252/8.62 |
| 4,668,726 A | * | 5/1987 | Howells ............. | C08G 18/0814 |
| | | | | 252/8.62 |
| 5,115,013 A | | 5/1992 | Röttger et al. | |
| 5,725,789 A | * | 3/1998 | Huber ................ | C08G 18/2885 |
| | | | | 106/2 |
| 5,910,557 A | | 6/1999 | Audenaert ......... | C08G 18/2805 |
| | | | | 252/8.62 |
| 6,288,157 B1 | | 9/2001 | Jariwala et al. | |
| 6,383,633 B1 | * | 5/2002 | Allewaert .......... | C08G 18/6279 |
| | | | | 428/375 |
| 6,852,781 B2 | | 2/2005 | Savu et al. | |
| 7,078,456 B2 | | 7/2006 | Jariwala et al. | |
| 7,662,461 B2 | | 2/2010 | Xia et al. | |
| 7,750,093 B2 | | 7/2010 | Elsbernd et al. | |
| 8,440,779 B2 | | 5/2013 | Audenaert et al. | |
| 8,993,116 B2 | * | 3/2015 | Jariwala ................ | C08J 7/0427 |
| | | | | 428/480 |
| 9,702,081 B2 | * | 7/2017 | Sworen ............... | D06M 15/576 |
| 2015/0038037 A1 | * | 2/2015 | Coppens ............. | D06M 15/277 |
| | | | | 442/164 |

FOREIGN PATENT DOCUMENTS

| | | |
|---|---|---|
| WO | WO 2010-074877 A1 | 7/2010 |
| WO | WO 2016-130503 A1 | 8/2016 |

OTHER PUBLICATIONS

Wallington, T.J., "Formation of C7F15COOH (PFOA) and Other Perfluorocarboxylic Acids during the Atmospheric Oxidation of 8:2 Fluorotelomer Alcohol", Environ. Sci. Technol., 2006, vol. 40, pp. 924-930.

* cited by examiner

*Primary Examiner* — Andrew T Piziali
(74) *Attorney, Agent, or Firm* — Thomas M. Spielbauer

(57) ABSTRACT

Hydrophobic polyurethane polymers which may be useful in making synthetic leathers comprising at least two immediately consecutive repeating units according to Formula I:

$$(-OC(O)N-)_n A\text{-}NC(O)O\text{-}L(M)\text{-} \quad (I)$$

wherein n is 1 or 2, A represents the residue of an organic di- or tri-isocyanate compound, L represents a hydrocarbon group that optionally contains one or more catenary or non-catenary hetero-atoms, and M represents an oligomer comprising 2-12 (meth)acrylate units. The polyurethane polymers may additionally comprise end group(s) according to the formula -L'M wherein L' represents a hydrocarbon group that may contain one or more catenary or non-catenary hetero-atoms. In some embodiments, M is according to Formula III:

$$\left(\text{-CH}_2\overset{\overset{\displaystyle Q}{|}}{\underset{\underset{\displaystyle \overset{\displaystyle |}{O}}{\overset{\displaystyle \|}{C}=O}}{C}}\right)_p\text{-H} \quad (III)$$
$$\phantom{xxxxxxxxx}|$$
$$\phantom{xxxxxxxxx}Z$$

wherein Q is hydrogen or methyl, p is an integer between 2 and 12 inclusive, and Z is a hydrocarbon group which may optionally be substituted.

15 Claims, No Drawings

HYDROPHOBIC POLYURETHANE RESINS

FIELD OF THE DISCLOSURE

This disclosure relates to hydrophobic polyurethane polymers such as may be useful in the production of synthetic leather.

BACKGROUND OF THE DISCLOSURE

The following references may be relevant to the general field of technology of the present disclosure: U.S. Pat. No. 8,440,779 (WO 2006/052325); WO 2016/130503; U.S. Pat. Nos. 6,288,157; 7,078,456; 7,750,093; 5,115,013; and 7,662,461.

SUMMARY OF THE DISCLOSURE

Briefly, the present disclosure provides polyurethane polymers comprising at least two immediately consecutive repeating units according to Formula I:

$$(-OC(O)N-)_n A\text{-}NC(O)O\text{-}L(M)\text{-} \quad (I)$$

wherein n is 1 or 2, selected independently for each repeating unit, wherein A represents the residue of an organic di- or tri-isocyanate compound excluding its isocyanate groups, selected independently for each repeating unit, wherein L represents a hydrocarbon group that may optionally contain one or more catenary or non-catenary hetero-atoms, selected independently for each repeating unit, and wherein M represents an oligomer comprising 2-12 (meth)acrylate units derived from one or more (meth)acrylate monomers, selected independently for each repeating unit. In some embodiments, n is 1 for each repeating unit. In some embodiments, L is according to Formula II:

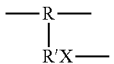
(II)

wherein R and R' represent hydrocarbon groups and X represents O, NH, or S. In some embodiments, the polyurethane polymers additionally comprises at least one end group according to the formula -L'M wherein L' represents a hydrocarbon group that may optionally contain one or more catenary or non-catenary hetero-atoms, selected independently for each end group. In some embodiments, L' is according to the formula —R"X'—, wherein R" represents a hydrocarbon group and X' represents O, NH, or S. In some embodiments, M is selected from moieties according to Formula III:

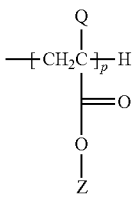
(III)

wherein each Q is independently selected from hydrogen or methyl, each p is independently selected from integers between 2 and 12 inclusive, and each Z is independently selected from hydrocarbon groups which are optionally substituted. In some embodiments, Z is selected from C2-C22 n-alkyl, branched alkyl, or cycloaliphatic groups. In some embodiments, Z is selected from C16-C22 n-alkyl groups. In some embodiments, the polyurethane polymer comprises no fluorine. In some embodiments, the polyurethane polymer comprises no carbodiimide groups. Additional embodiments of the polyurethane polymers of the present disclosure are described below under "Selected Embodiments."

In another aspect, the present disclosure provides synthetic leathers comprising the polyurethane polymers according to the present disclosures. In some embodiments, the synthetic leathers additionally comprises fibrous supports. In some embodiments, the fibrous supports are polymeric, such as polyester, polyimide or polypropylene. In some embodiments, the fibrous supports are non-woven fibrous supports, such as polypropylene nonwoven felts. In some embodiments, the fibrous supports are coated with or embedded in the polyurethane polymers. Additional embodiments of the synthetic leathers of the present disclosure are described below under "Selected Embodiments."

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:

"synthetic leather" means an imitation leather comprising synthetic polymers;

"(meth)acrylate monomers" include acrylate monomers and/or methacrylate monomers; and "substituted" means, for a chemical species, group or moiety, substituted by conventional substituents which do not interfere with the desired product or process, e.g., substituents can be alkyl, alkoxy, aryl, phenyl, halo (F, Cl, Br, I), cyano, nitro, etc.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides hydrophobic polyurethanes, which in some embodiments may be used to make water- and/or stain-resistant synthetic leathers. The water- and/or stain-resistant synthetic leather may advantageously be fluorine-free. The subject polyurethanes comprising at least two or more immediately consecutive repeating units according to Formula I:

$$(-OC(O)N-)_n A\text{-}NC(O)O\text{-}L(M)\text{-} \quad (I)$$

where n is 1 or 2, selected independently for each repeating unit, where A represents the residue of an organic di- or tri-isocyanate compound excluding its isocyanate groups, selected independently for each repeating unit, where L represents a hydrocarbon group that may optionally contain one or more catenary or non-catenary hetero-atoms, selected independently for each repeating unit, and wherein M represents an oligomer comprising 2-12 (meth)acrylate units derived from one or more (meth)acrylate monomers, selected independently for each repeating unit. In some embodiments, n is 1 and A represents the residue of an organic diisocyanate compound excluding its isocyanate groups. In some embodiments, L-M represents the residue of a diol (HO)$_2$L-M which is a reactant in the formation of the polyurethane. In some embodiments, the polyurethane is the polymerization product of a diol (HO)$_2$L-M and a diisocyanate OCN-A-NCO.

Any suitable di- or tri-isocyanates may be used to make the polyurethane of the present disclosure. In some embodiments, suitable di- or tri-isocyanates may include aliphatic and aromatic di- and triisocyanates. Examples of diisocyanates may include 4, 4'-methylenediphenylenediisocyanate (MDI), 2, 4-toluenediisocyanate, 2, 6-toluene diisocyanate, o, m, and p-xylylene diisocyanate, 4, 4'-diisocyanatodiphenylether, 3, 3'-dichloro-4, 4'-diisocyanatodiphenylmethane, 4, 4'-diphenyldiisocyanate, 4, 4'-diisocyanatodibenzyl, 3, 3'-dimethoxy-4, 4'-diisocyanatodiphenyl, 3, 3'-dimethyl-4, 4'-diisocyanatodiphenyl, 2, 2'-dichloro-5, 5'-dimethoxy-4, 4'-diisocyanato diphenyl, 1, 3-diisocyanatobenzene, 1, 2-naphthylene diisocyanate, 4-chloro-1, 2-naphthylene diisocyanate, 1, 3-naphthylene diisocyanate, and 1, 8-dinitro-2, 7-naphthylene diisocyanate; alicyclic diisocyanates such as 3-isocyanatornethyl-3, 5, 5-trimethylcyclohexylisocyanate; 3-isocyanatomethyl-3, 5, 5-trimethylcyclohexylisocyanate; aliphatic diisocyanates such as 1, 6-hexamethylenediisocyanate, 2, 2, 4-trimethyl-1, 6-hexamethylenediisocyanate, and 1, 2-ethylenediisocyanate; cyclic diisocyanates such as isophorone diisocyanate (IPDI) and dicyclohexylmethane-4, 4'-diisocyanate. Examples of triisocyanates include aliphatic triisocyanates such as 1, 3, 6-hexamethylenetriisocyanate and aromatic triisocyanates such as polymethylenpolyphenylisocyanate (PAPI, Voranate™) DESMODUR™R (tri-(4-isocyanatophenyl)-methane, available from Bayer) and DESMODUR™L (available from Bayer). Also useful are isocyanates containing internal isocyanate derived moieties such as biuret-containing triisocyanates such as that available from Bayer as DESMODUR™N-100 and isocyanurate-containing triisocyanates such as that available from Huis AG, Germany, as IPDI-1890 and Desmodur™N-3300, available from Bayer. Particular suitable polyisocyanates may include aromatic polyisocyanates such as MDI and 2, 4-toluenediisocyanate and aliphatic polyisocyanates, such as hexamethylene diisocyanate, Desmodur™N, Desmodur™W and Desmodur™N-3300.

In some embodiments, the polyurethane polymer has one or more end groups according to the formula -L'-M wherein L' represents a hydrocarbon group that may optionally contain one or more catenary or non-catenary hetero-atoms, selected independently for each end group. In some embodiments, L'-M represents the residue of a mono-alcohol HO-L'-M which is a reactant in the formation of the polyurethane. In some embodiments, the polyurethane is the polymerization product of a diol (HO)$_2$L-M and a diisocyanate OCN-A-NCO, and a mono-alcohol HO-L'-M.

In some embodiments, L and L' moieties are residues of diol and mono-alcohol reactants used in the formation of a poly(meth)acrylate. In some embodiments, L and L' moieties are residues of chain transfer agents included during the free radical oligomerization of a poly(meth)acrylate. Examples of mono functional chain transfer agents include those selected from 2-mercaptoethanol, 3-mercapto-2-butanol, 3-mercapto-2-propanol, 3-mercapto-1-propanol and 2-mercapto-ethylamine. A particularly suitable monofunctional chain transfer agent is 2-mercaptoethanol. Examples of difunctional chain transfer agents include those having two hydroxyl or amino groups or a hydroxy and amino group. A particular suitable example of a difunctional chain transfer agent is 3-mercapto-1, 2-propanediol.

In the polyurethane of the present disclosure, M represents an oligomer comprising 2-12 (meth)acrylate units derived from one or more (meth)acrylate monomers, selected independently for each repeating unit. In some embodiments, each M is independently selected from moieties according to Formula III:

wherein each Q is independently selected from hydrogen or methyl, each p is independently selected from integers between 2 and 12 inclusive, and each Z is independently selected from hydrocarbon groups which are optionally substituted. The oligomer may comprise any suitable monomers. Examples of such monomers may include acrylic acid esters and methacrylic acid esters such as butyl, isobutyl, hexyl, heptyl, 2-ethyl-hexyl, cyclohexyl, lauryl, stearyl, isobornyl, octadecyl, hexadecyl or alkoxy ethyl acrylates and methacrylates. Particular suitable monomers include those selected from the group consisting of octadecyl(meth)acrylate, hexadecyl(meth)acrylate, methylmethacrylate, butyl(meth)acrylate, isobutyl(meth)acrylate and isobornyl (meth)acrylate, ethylhexyl methacrylate, and mixtures thereof.

In some embodiments, the polyurethane polymer according to the present disclosure may be used to make synthetic leathers. In some embodiments, the synthetic leather additionally comprises a fibrous support. In some embodiments, the fibrous support is coated with the polyurethane or embedded in the polyurethane. The terms "coated" and "embedded" are intended to represent structure, and not to limit the process used to obtain the recited structure. In some embodiments, the fibrous support is polymeric. In some embodiments, the fibrous support may be selected from polyester, polyamide, polypropylene. In some embodiments, the fibrous support is a woven support. In some embodiments, the fibrous support is a non-woven fibrous support. In some embodiments, the fibrous support is a blown non-woven support. In some embodiments, the fibrous support is a felt. In some embodiments, the fibrous support is a polypropylene nonwoven felt.

Additional embodiments may be limited to the ranges and/or compositions recited in the Selected Embodiments below.

SELECTED EMBODIMENTS

The following embodiments, designated by letter and number, are intended to further illustrate the present disclosure but should not be construed to unduly limit this disclosure.

P1. A polyurethane polymer comprising at least two immediately consecutive repeating units according to Formula I:

(—OC(O)N—)$_n$-A-NC(O)O-L(M)-     (I)

wherein n is 1 or 2, selected independently for each repeating unit,
wherein A represents the residue of an organic di- or tri-isocyanate compound excluding its isocyanate groups, selected independently for each repeating unit, wherein L represents a hydrocarbon group that may optionally contain one or more catenary or non-catenary hetero-atoms, selected independently for each repeating unit, and
wherein M represents an oligomer comprising 2-12 (meth)acrylate units derived from one or more (meth)acrylate monomers, selected independently for each repeating unit.

P2. The polyurethane polymer according to embodiment P1 comprising at least three immediately consecutive repeating units according to Formula I.

P3. The polyurethane polymer according to embodiment P1 comprising at least four immediately consecutive repeating units according to Formula I.

P4. The polyurethane polymer according to embodiment P1 comprising at least six immediately consecutive repeating units according to Formula I.

P5. The polyurethane polymer according to embodiment P1 comprising at least eight immediately consecutive repeating units according to Formula I.

P6. The polyurethane polymer according to embodiment P1 comprising at least ten immediately consecutive repeating units according to Formula I.

P7. The polyurethane polymer according to any of the preceding embodiments wherein n is 1 for each repeating unit.

P8. The polyurethane polymer according to any of the preceding embodiments wherein each A is the same for each repeating unit.

P9. The polyurethane polymer according to any of the preceding embodiments wherein each L is the same for each repeating unit.

P10. The polyurethane polymer according to any of the preceding embodiments wherein each M is the same for each repeating unit.

P11. The polyurethane polymer according to any of the preceding embodiments wherein at least one A is aromatic.

P12. The polyurethane polymer according to any of the preceding embodiments wherein for at least one repeating unit n is 1 and A is -phenylene-CH$_2$-phenylene- P13. The polyurethane polymer according to any of the preceding embodiments wherein at least one L is according to Formula II:

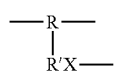
(II)

wherein R and R' represent hydrocarbon groups and X represents O, NH, or S.

P14. The polyurethane polymer according to embodiment P13 wherein each R is independently selected from

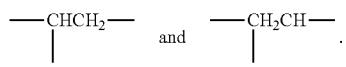

P15. The polyurethane polymer according to any of embodiments P13-P14 wherein each R' is independently selected from methylene, ethylene, propylene and butylene.

P16. The polyurethane polymer according to any of embodiments P13-P14 wherein each R' is independently selected from methylene and ethylene.

P17. The polyurethane polymer according to any of embodiments P13-P14 wherein each R' is methylene.

P18. The polyurethane polymer according to any of embodiments P13-P17 wherein X is S.

P19. The polyurethane polymer according to any of the preceding embodiments additionally comprising at least one end group according to the formula -L'M wherein L' represents a hydrocarbon group that may optionally contain one or more catenary or non-catenary hetero-atoms, selected independently for each end group.

P20. The polyurethane polymer according to embodiment P19 wherein at least one L' is according to the formula —R"X'—, wherein R" represents a hydrocarbon group and X' represents O, NH, or S.

P21. The polyurethane polymer according to embodiment P20 wherein each R" is independently selected from methylene, ethylene, propylene and butylene.

P22. The polyurethane polymer according to embodiment P20 wherein each R' is ethylene.

P23. The polyurethane polymer according to any of embodiments P20-P22 wherein X' is S.

M1. The polyurethane polymer according to any of the preceding embodiments wherein each M is independently selected from moieties according to Formula III:

(III)

wherein each Q is independently selected from hydrogen or methyl, each p is independently selected from integers between 2 and 12 inclusive, and each Z is independently selected from hydrocarbon groups which are optionally substituted.

M2. The polyurethane polymer according to embodiment M1 wherein each Q is the same for each repeating unit.

M3. The polyurethane polymer according to embodiment M1 wherein each Q is H.

M4. The polyurethane polymer according to any of embodiments M1-M3 wherein each p is independently selected from integers between 2 and 10 inclusive.

M5. The polyurethane polymer according to any of embodiments M1-M3 wherein each p is independently selected from integers between 2 and 8 inclusive.

M6. The polyurethane polymer according to any of embodiments M1-M5 wherein each Z is independently selected from C2-C22 n-alkyl, branched alkyl, or cycloaliphatic groups.

M7. The polyurethane polymer according to any of embodiments M1-M5 wherein each Z is independently selected from C2-C22 n-alkyl or branched alkyl groups.

M8. The polyurethane polymer according to any of embodiments M1-M5 wherein each Z is independently selected from C2-C22 n-alkyl groups.

M9. The polyurethane polymer according to any of embodiments M1-M8 wherein each Z comprises at least 6 carbons.
M10. The polyurethane polymer according to any of embodiments M1-M8 wherein each Z comprises at least 16 carbons.
M11. The polyurethane polymer according to any of embodiments M1-M10 wherein each Z comprises not more than 20 carbons.
M12. The polyurethane polymer according to any of embodiments M1-M10 wherein each Z comprises not more than 18 carbons.
M13. The polyurethane polymer according to any of embodiments M1-M12 wherein at least one Z comprises an octadecyl group.
M14. The polyurethane polymer according to any of embodiments M1-M12 wherein each Z comprises an octadecyl group.
M15. The polyurethane polymer according to any of embodiments M1-M5 wherein each Z is an octadecyl group.
A1. The polyurethane polymer according to any of the preceding embodiments comprising no immediately consecutive repeating units other than those according to Formula I.
A2. The polyurethane polymer according to any of the preceding embodiments comprising no fluorine.
A3. The polyurethane polymer according to any of the preceding embodiments comprising no carbodiimide groups.
A4. A synthetic leather comprising the polyurethane polymer according to any of the preceding embodiments.
A5. The synthetic leather according to embodiment A4 additionally comprising a fibrous support.
A6. The synthetic leather according to embodiment A5 wherein the fibrous support is a polymeric, non-woven fibrous support.
A7. The synthetic leather according to embodiment A5 wherein the fibrous support is a polypropylene nonwoven felt.
A8. The synthetic leather according to any of embodiments A5-A7 wherein the fibrous support is coated with the polyurethane polymer.
A9. The synthetic leather according to any of embodiments A5-A7 wherein the fibrous support is embedded in the polyurethane polymer.

Objects and advantages of this disclosure are further illustrated by the following examples, but the particular materials and amounts thereof recited in these examples, as well as other conditions and details, should not be construed to unduly limit this disclosure.

EXAMPLES

All materials are commercially available, for example from Sigma-Aldrich Chemical Company, Milwaukee, Wis., USA, or may be synthesized by known methods, or are known to those skilled in the art, unless otherwise stated or apparent.

The following abbreviations are used in this section: L=Liters, g=grams, cm=centimeters, wt %=percent by weight, min=minutes, h=hours, eq=equivalent, ° C.=degrees Celsius. Abbreviations for materials used in this section, as well as descriptions of the materials, are provided in Table 1.

Materials

TABLE 1

| Material | Details |
| --- | --- |
| ODA | Octadecyl acrylate, available from NOF Corporation, White Plains, NY, and Miwon Specialty Chemicals, Yongin-si, Korea |
| Thioglycerol | Available from Sigma-Aldrich |
| Mercaptoethanol | Available from Sigma-Aldrich |
| Vazo-67 | Available from Sigma-Aldrich |
| Ethyl Acetate | Available from Sigma-Aldrich |
| MDI | 4,4'-methylenediphenyl diisocyanate, available from Sigma-Aldrich |
| MeFBSE | $C_4F_9SO_2N(CH_3)CH_2CH_2OH$, may be prepared as described in U.S. Pat. No. 6,852,781 |
| FBSEE | $C_4F_9SO_2N(C_2H_4OH)_2$, may be prepared as described in PCT Appl. No. WO2010074877 |
| DMF | N,N-dimethyl formamide, available from Sigma-Aldrich |
| Dibutyl tin dilaurate | Available from Sigma-Aldrich |
| PPG 1200 | Polypropylene glycol 1200 Mw, available as PPG-20 from Dow Chemical Company |
| Nonwoven | Polyester nonwoven felt |
| Water | Deionized water |
| Dye Solution | A solution 7 wt % in FD&C Red 40 (available from Ingredients Technology Corp., a subsidiary of Crompton and Knowles Corp., Mahwah, NJ, USA) and 0.1 wt % in citric acid monohydrate (available from Sigma-Aldrich) in water |

Preparative Example 1 (PE-1), ODA-Diol

To a 2 L glass reaction vessel fitted with overhead stirring, a condenser and a nitrogen inlet was added 398.5 g of ODA (1.23 mol, 4 eq), 400.0 g of ethyl acetate and 36.89 g of thioglycerol (0.34 mol, 1 eq). This was heated to 65° C., with slow stirring once enough ODA had melted to allow it. Once completely dissolved, nitrogen was bubbled in with stirring for 20 min to deoxygenate the solution. After 20 min, stirring was maintained and the temperature increased to 70° C. in a nitrogen atmosphere. To this stirred solution was added 0.87 g of Vazo-67 (2 percent to solids) in two portions. Roughly half was added and an exotherm was observed raising the temperature of the vessel's contents to 76.2° C. After the temperature had cooled back to 70° C., the second portion was added. After addition of the second portion of initiator, stirring and heat were maintained for 2 h. The solvent was then stripped under reduced pressure. The product was poured from the vessel into an aluminum pan to dry, yielding about 420 g of a white waxy solid (96.5% yield).

Preparative Example 2 (PE-2), ODA-OH

The procedure described for PE-1 was followed, except that mercaptoethanol was used in place of the thioglycerol.

Examples 1 Through 3 (EX-1 Through EX-3) and Comparative Examples 1 and 2 (CE-1 and CE-2

Protective polyurethanes (PPUs) were synthesized from MDI, a diol oligomer, as indicated in Table 2, and either with or without a mono-alcohol endgroup, as indicated in Table 2. To synthesize PPUs without mono-alcohol endgroups, equimolar portions of MDI and diol were added to DMF at 50% solids concentration. The reaction mixture was heated to 70° C. with stirring, then a catalyst (dibutyl tin dilaurate) was added at 5% to the total solids, and the reaction temperature was maintained with stirring for 2 h. To synthesize PPUs with mono-alcohol endgroups, the same procedure was followed, except that MDI was added in a 2% molar excess relative to the diol indicated in Table 2, then after 2 h, the mono-alcohol indicated in Table 2 was added and heating was maintained for 2 additional h. In all PPUs, the molar ratio of acrylate to alcohol was 4:1.

To test the efficacy of the PPUs, test synthetic leather strips were prepared. PPUs indicated in Table 2 were mixed with a base polyurethane (PU) (prepared by adding a 1:1 molar ratio of MDI and PPG 1200 at 25% solids in DMF), so that the PPU was 1% of the total solids. For CE-2, the base PU, prepared without PPU, was used. These solutions were each then diluted with 2 more mass equivalents of DMF, giving a polymer solution that was roughly 8.5% solids. These solutions were heated to 70° C. in an oven for 1 h to attain full dissolution, then allowed to cool on a shaker table to prevent separation upon cooling. Strips of polypropylene nonwoven felt was placed into each Example or Comparative Example solution listed in Table 2 for 5 min to deposit the indicated PUs on the felt, then rinsed in stirred DI water for 5 min to rinse away the DMF. The strips were then dried in a vented oven at 125° C. for 1 h. After being removed from the oven, the samples were allowed to equilibrate in a humidity controlled room for at least 2 h before testing. Samples were suspended vertically on binder clips, and dipped 1 cm into Dye Solution. The samples were covered and left undisturbed for 24 h. After 24 h, the samples were removed and dabbed twice with a paper towel to removed residual solution. The vertical distance of wicking of the dye was recorded on each, and compared to the wicking distance on CE-2. A retention factor was calculated as the ratio of the wicking distance of each Example or Comparative Example with the wicking distance for CE-2. The Retention Factor results for EX-1 through EX-3 and CE-1 and CE-2 are presented in Table 2. For example, if the wicking distance for a sample was 0.5 cm, and the wicking distance for CE-2 was 1.0 cm, the Retention Factor would be 0.5 cm/1.0 cm, or 0.5. A Retention Factor of 0 indicates no wicking for the Example or Comparative Example and a value of 1.0 would indicate the sample wicked as much as CE-2.

TABLE 2

| EX or CE Number | Diol | Mono-Alcohol Endgroup | Retention Factor |
|---|---|---|---|
| EX-1 | PE-1 | none | 0.0 |
| EX-2 | PE-1 | PE-2 | 0.0 |
| EX-3 | PE-1 | MeFBSE | 0.2 |
| CE-1 | FBSEE | none | 0.0 |
| CE-2 | PPG 1200 | none | 1.0 |

The data indicate that PPUs comprising the ODA (PE-1) oligomer diol provide water repellency at the same level as FBSEE when used by themselves, or in combination with the ODA oligomer mono-alcohol (PE-2) as an end group, but without the fluorine content of FBSEE.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:
1. A polyurethane polymer comprising at least two immediately consecutive repeating units according to Formula I:

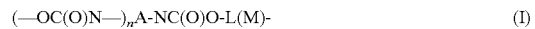

(—OC(O)N—)$_n$A-NC(O)O-L(M)- (I)

wherein n is 1 or 2, selected independently for each repeating unit,
wherein A represents the residue of an organic di- or tri-isocyanate compound excluding its isocyanate groups, selected independently for each repeating unit,
wherein L represents a hydrocarbon group that may optionally contain one or more catenary or non-catenary hetero-atoms, selected independently for each repeating unit, and
wherein M represents an oligomer comprising 2-12 (meth)acrylate units derived from one or more (meth) acrylate monomers, selected independently for each repeating unit.

2. The polyurethane polymer according to claim 1 wherein n is 1 for each repeating unit.

3. The polyurethane polymer according to claim 1 wherein at least one L is according to Formula II:

(II)

—R—
  |
  R'X— wherein R and R' represent hydrocarbon groups and X represents O, NH, or S.

4. The polyurethane polymer according to claim 3 wherein X is S.

5. The polyurethane polymer according to claim 1 additionally comprising at least one end group according to the formula -L'M wherein L' represents a hydrocarbon group that may optionally contain one or more catenary or non-catenary hetero-atoms, selected independently for each end group.

6. The polyurethane polymer according to claim 5 wherein at least one L' is according to the formula —R"X'—, wherein R" represents a hydrocarbon group and X' represents O, NH, or S.

7. The polyurethane polymer according to claim 6 wherein X' is S.

8. The polyurethane polymer according to claim 1 wherein each M is independently selected from moieties according to Formula III:

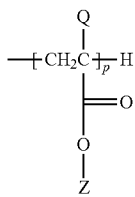

(III)

wherein each Q is independently selected from hydrogen or methyl, each p is independently selected from integers between 2 and 12 inclusive, and each Z is independently selected from hydrocarbon groups which are optionally substituted.

9. The polyurethane polymer according to claim 8 wherein each Z is independently selected from C2-C22 n-alkyl, branched alkyl, or cycloaliphatic groups.

10. The polyurethane polymer according to claim 8 wherein each Z is independently selected from C16-C22 n-alkyl groups.

11. The polyurethane polymer according to claim 8 wherein each Z is an octadecyl group.

12. The polyurethane polymer according to claim 1 comprising no fluorine.

13. The polyurethane polymer according to claim 1 comprising no carbodiimide groups.

14. A synthetic leather comprising the polyurethane polymer according to claim 1.

15. The synthetic leather according to claim 14 additionally comprising a fibrous support which is a polymeric, non-woven fibrous support, and wherein the fibrous support is coated with or embedded in the polyurethane polymer.

* * * * *